United States Patent
Shang et al.

(10) Patent No.: US 9,133,029 B2
(45) Date of Patent: Sep. 15, 2015

(54) METHOD FOR MAKING LITHIUM IRON PHOSPHATE CATHODE MATERIAL

(71) Applicants: Tsinghua University, Beijing (CN); HONG FU JIN PRECISION INDUSTRY (ShenZhen) CO., LTD., Shenzhen (CN)

(72) Inventors: Yu-Ming Shang, Beijing (CN); Yao-Wu Wang, Beijing (CN); Xiao-Feng Xie, Beijing (CN); Shu-Bo Wang, Beijing (CN); Jin-Hai Wang, Beijing (CN); Yong-Gang Liu, Beijing (CN); Xiao Zhao, Beijing (CN); Jing-Bo Chen, Beijing (CN); Mou Fang, Beijing (CN)

(73) Assignees: Tsinghua University, Beijing (CN); HONG FU JIN PRECISION INDUSTRY (ShenZhen) CO., LTD., Shenzhen (CN)

( * ) Notice: Subject to any disclaimer, the term of this patent is extended or adjusted under 35 U.S.C. 154(b) by 123 days.

(21) Appl. No.: 14/019,936

(22) Filed: Sep. 6, 2013

(65) Prior Publication Data

US 2014/0072496 A1 Mar. 13, 2014

(30) Foreign Application Priority Data

Sep. 13, 2012 (CN) .......................... 2012 1 3400280

(51) Int. Cl.
*C01B 25/45* (2006.01)
*C01B 25/30* (2006.01)
*C01D 15/00* (2006.01)
*C01B 25/37* (2006.01)

(52) U.S. Cl.
CPC ............... *C01B 25/306* (2013.01); *C01B 25/30* (2013.01); *C01B 25/45* (2013.01); *C01B 25/375* (2013.01); *C01D 15/00* (2013.01)

(58) Field of Classification Search
CPC ...... C01B 25/30; C01B 25/375; C01B 25/45; C01D 15/00
See application file for complete search history.

(56) References Cited

FOREIGN PATENT DOCUMENTS

JP 2011086524 A * 4/2011

OTHER PUBLICATIONS

English machine translation of JP2011-086524A.*

* cited by examiner

*Primary Examiner* — Anthony J Zimmer
*Assistant Examiner* — Justin Bova
(74) *Attorney, Agent, or Firm* — Novak Druce Connolly Bove + Quigg LLP

(57) ABSTRACT

A method for making lithium iron phosphate is provided. In the method, an alkali is reacted with a ferric salt in water to form a red colored ferric hydroxide precipitate in the water. The red colored ferric hydroxide precipitate is mixed with deionized water, organic solvent, and emulsifier to form an water-in-oil emulsion. The phosphoric acid solution and iron metal powder are added to the water-in-oil emulsion to form ferrous hydrogen phosphate. A lithium source is introduced to the water-in-oil emulsion and reacted with the ferrous hydrogen phosphate to form a precursor in the water-in-oil emulsion. The precursor is heated in a protective gas at a heating temperature in a range from about 600° C. to about 800° C. to form lithium iron phosphate.

20 Claims, 2 Drawing Sheets

METHOD FOR MAKING LITHIUM IRON PHOSPHATE CATHODE MATERIAL

RELATED APPLICATIONS

This application claims all benefits accruing under 35 U.S.C. §119 from China Patent Application No. 201210340028.0, filed on Sep. 13, 2012 in the China Intellectual Property Office, the disclosure of which is incorporated herein by reference.

BACKGROUND

1. Technical Field

The present disclosure relates to a method for making lithium iron phosphate cathode material.

2. Discussion of Related Art

Olivine type lithium iron phosphate (e.g. $LiFePO_4$), is an attractive cathode active material. Lithium iron phosphate has advantages of high safety, low cost, and environmental friendliness. However, lithium iron phosphate has deficiencies such as a low electronic conductivity and a slow diffusion of lithium ions. Efforts on improving the electronic conductivity of lithium iron phosphate have been made by carbon coating the lithium iron phosphate particle surface, and doping the lithium iron phosphate with metal ions. In the aspect of improving the diffusion of lithium ions, particle size minimization of the lithium iron phosphate has been undertaken to decrease a diffusion path of the lithium ions. However, the most widely used method in lithium ion battery industry for forming the lithium iron phosphate is the solid state method, which consumes large energy. The product formed by the solid state method has a relatively large particle size and an unsatisfactory discharge performance at a large discharge current.

What is needed, therefore, is to provide a method for making lithium iron phosphate which can avoid the above described disadvantages.

BRIEF DESCRIPTION OF THE DRAWING

Many aspects of the present disclosure can be better understood with reference to the following drawings. The components in the drawings are not necessarily to scale, the emphasis instead being placed upon clearly illustrating the principles of the present embodiments.

DETAILED DESCRIPTION

Figure 1:
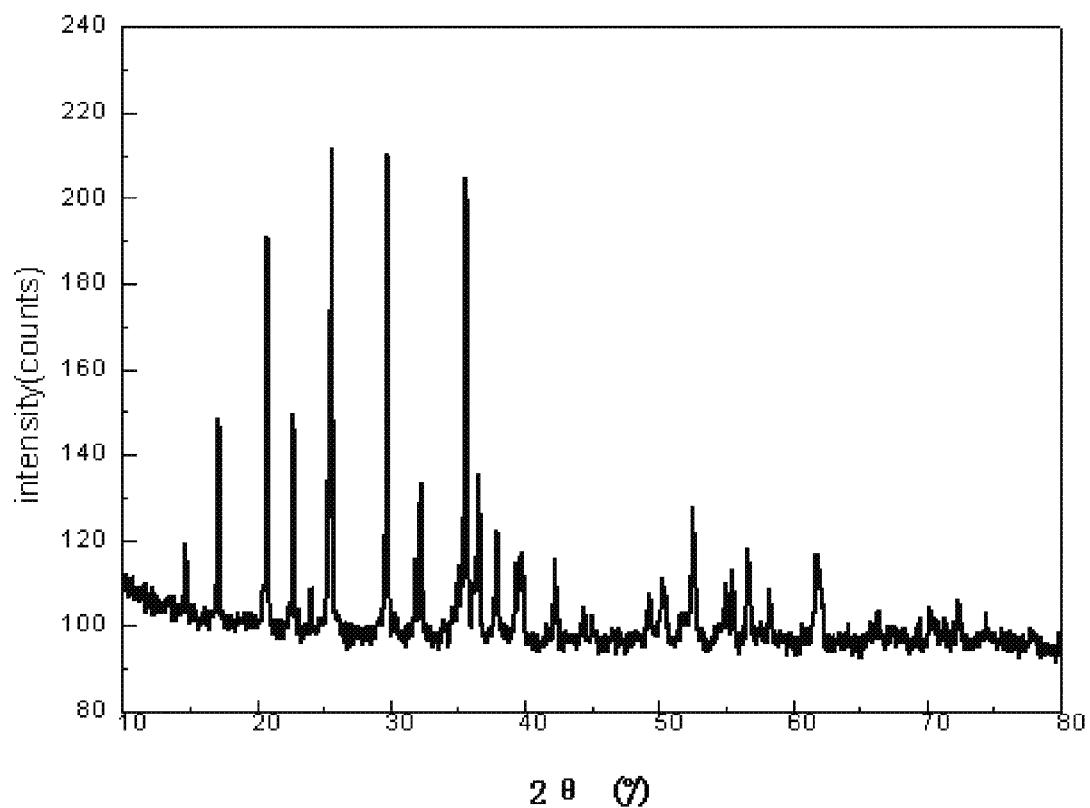
FIG. 1 shows an X-ray diffraction (XRD) pattern of one embodiment of lithium iron phosphate.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

A method for making lithium iron phosphate including steps of:
S1, reacting an alkali with a ferric salt in water to form a red colored ferric hydroxide ($Fe(OH)_3$) precipitate;
S2, mixing the red colored $Fe(OH)_3$ precipitate with deionized water, organic solvent, and emulsifier to form an water-in-oil emulsion;
S3, adding phosphoric acid solution and iron metal powder to the water-in-oil emulsion to form ferrous hydrogen phosphate ($FeHPO_4$);
S4, introducing a lithium source to the water-in-oil emulsion, the lithium source reacts with the $FeHPO_4$ to form a precursor in the water-in-oil emulsion;
S5, heating the precursor in a protective gas to form lithium iron phosphate.

In the step S1, the alkali can be dissolved in water to form a solution with a mass concentration of about 5 wt % to about 30 wt % (i.e., the concentration of the alkali in the water solution can be about 5 wt % to about 30 wt %). The ferric salt can also be dissolved in another water to form another solution with a mass concentration of about 5 wt % to about 30 wt % (i.e., the concentration of the ferric salt in the other water solution can be 5 about wt % to about 30 wt %). The ferric salt can be at least one of iron(III) chloride ($FeCl_3$), iron (III) nitrate ($Fe(NO_3)_3$), and iron (III) sulfate ($Fe_2(SO_4)_3$). The alkali can be at least one of ammonia, sodium hydroxide (NaOH), and potassium hydroxide (KOH). The two water solutions can be mixed together by adding the alkali water solution droplet by droplet to the ferric salt water solution during stirring of the ferric salt water solution. The red colored $Fe(OH)_3$ precipitate formed in the water can have a small particle size. The red colored $Fe(OH)_3$ precipitate can be filtered from the water and washed for several times. A molar ratio of the iron (III) ion ($Fe^{3+}$) to the hydroxide ion (OH) in the mixed water solution can be in a range from about 1:3 to about 1:3.3.

In the step S2, the filtered red colored $Fe(OH)_3$ precipitate, deionized water, organic solvent, and emulsifier can be mixed in a container and stirred until the water-in-oil emulsion is formed. A mass ratio of the deionized water to the red colored $Fe(OH)_3$ precipitate can be in a range from about 5:1 to about 15:1. A mass ratio of the organic solvent to the deionized water can be in a range from about 1:1 to about 3:1. A mass ratio of the emulsifier to the red colored $Fe(OH)_3$ precipitate can be in a range from about 0.1:100 to about 1:100. The organic solvent can be at least one of toluene, xylene, petroleum ether, chloroform, methylene chloride, carbon tetrachloride, nitrobenzene, and ethyl acetate. The emulsifier can be at least one of nonylphenoxypoly(ethyleneoxy)ethanol, polyoxyethylene octylphenol ether, lauryl alcohol, polyethylene glycol, polyacrylic acid, and polyacrylamide.

The step S3 can includes substeps of: S31, adding the phosphoric acid solution to the water-in-oil emulsion; stirring the water-in-oil emulsion having the phosphoric acid therein at a temperature ranged from about 40° C. to about 60° C. for a first period of time; adding the iron metal powder to the water-in-oil emulsion having the phosphoric acid therein; and stirring the water-in-oil emulsion having the phosphoric acid and the iron metal powder therein for a second period of time to from the $FeHPO_4$. The metal powder is a reducing agent of the ferric salt to reduce Fe (III) to Fe (II). A mass concentration of the phosphoric acid in the phosphoric acid solution can be about 85%. The first period of time can be ranged from about 2 hours to about 8 hours. The second period of time can be ranged from about 12 hours to about 24 hours. The water-in-oil emulsion having the phosphoric acid and the iron metal powder therein can also be stirred at the temperature ranged from about 40° C. to about 60° C. The $FeHPO_4$ can be formed in the water phase of the water-in-oil emulsion.

In the step S4, the lithium source can be slowly introduced to the water-in-oil emulsion part by part and stirred for about 2 hours to about 8 hours at the temperature range from about 40° C. to about 60° C. After stirring, the water-in-oil emulsion can be cooled to room temperature and left to stand for overnight. The formed solid in the water-in-oil emulsion can be filtered out, dried at 80° C. in vacuum, and collected. The filtrate can be recycled. The solid is the precursor. The lithium source can be at least one of lithium hydroxide and lithium carbonate.

After the step S4 and before the step S5, the method can further include a carbon source coating step of mixing the precursor with a carbon source organic material, an antioxidant, and deionized water to form a mixture. The mixture can be stirred for about 2 hours to about 6 hours and then dried in vacuum. A mass ratio of the carbon source organic material to the lithium iron phosphate to be formed can be in a range from about 2:100 to about 25:100. A mass ratio of the antioxidant to the lithium iron phosphate to be formed can be in a range from about 0.1:100 to about 1:100. A mass ratio of the deionized water to the lithium iron phosphate to be formed can be in a range from about 1:1 to about 10:1. The carbon source organic material can be at least one of starch, sucrose, glucose, phenol formaldehyde resin, polylactic acid, and poly (vinyl alcohol). The antioxidant can be at least one of formaldehyde, ascorbic acid, citric acid, and oxalic acid.

In the step S5, the mixture can be heated in an oven filled with the protective gas. The protective gas can be at least one of nitrogen gas and inert gas. The heating temperature can be in a range from about 600° C. to about 800° C. The heating time period can be in a range from about 3 hours to about 10 hours.

A molar ratio of the iron element, phosphorus element, and lithium element used in the method can be in a range from about 1:1:1 to about 1:1:1.15. A molar ratio of the iron element in the ferric salt to the iron metal powder can be about 2:1.

The water phase is small droplets uniformly dispersed in the oil phase in the water-in-oil emulsion. The precursor is formed in the water phase of the water-in-oil emulsion. Thus, the size of the precursor can be decreased. The small sized and well dispersed the precursor are good for the solid reaction during the heating step at the high temperature and can decrease the heating time. The product of the lithium iron phosphate has a small size, which is good for the cycling of the lithium ion battery at a high discharge current rate. The discharge capacity of the lithium ion battery using the lithium iron phosphate can be about 150 mAh/g at a discharge current rate of 1C, and 160 mAh/g at a discharge current rate of 0.1C.

More specific embodiments are described below.

EXAMPLE 1

10 kg of water solution of $FeCl_3$ having the concentration of 5 wt % is put into a reactor and stirred quickly. 7.41 kg of NaOH water solution having the concentration of 5 wt % is dropped slowly to the stirred water solution of $FeCl_3$, to form the red colored $Fe(OH)_3$ precipitate. The red colored $Fe(OH)_3$ precipitate is filtered out and washed for several times until. The formed red colored $Fe(OH)_3$ precipitate is totally put into another reactor followed by adding 1.7 kg of deionized water, 1.7 kg of toluene, and 0.35 g of nonylphenoxypoly(ethyleneoxy)ethanol thereto to form a mixture. The mixture is stirred quickly to form the water-in-oil emulsion. 533.8 g of phosphoric acid solution having the concentration of 85 wt % is added to the water-in-oil emulsion and then the water-in-oil emulsion is heated to about 40° C. and stirred for about 2 hours. Then, 86.4 g of iron metal powder is added to the water-in-oil emulsion, and stirred for about 12 hours. After that, 127.6 g of LiOH is added to the water-in-oil emulsion, and stirred for about 2 hours to form solid precursor in the water-in-oil emulsion. The water-in-oil emulsion is cooled to room temperature and left to stand for overnight. The solid precursor is filtered out and collected to be dried at about 80° C. in vacuum. The precursor is mixed with 16 g of starch, and 0.73 g of oxalic acid in 731 g of deionized water, and stirred for about 2 hours until the precursor, starch, oxalic acid are uniformly mixed in the water. The mixture is dried in vacuum to remove the water, and then moved to the heating oven filled with nitrogen gas to be heated at about 600° C. for about 6 hours. The XRD of the final product is shown in FIG. 1, which proves that the lithium iron phosphate is achieved.

Figure 2:
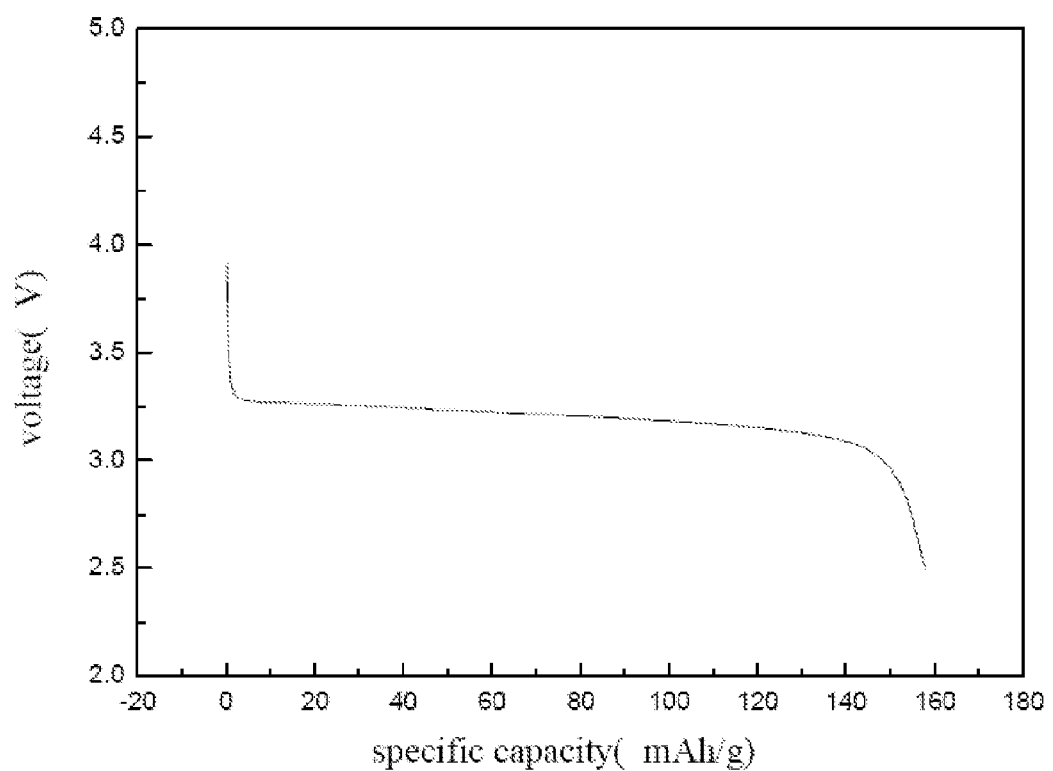
FIG. 2 shows a discharge curve of a lithium ion battery using the embodiment of lithium iron phosphate.

The lithium ion battery using the lithium iron phosphate as the cathode active material is assembled and cycled. The discharge curve of the lithium ion battery is shown in FIG. 2.

EXAMPLE 2

5 kg of water solution of $FeCl_3$ having the concentration of 30 wt % is put into a reactor and stirred quickly. 5.7 kg of KOH water solution having the concentration of 30 wt % is dropped slowly to the stirred water solution of $FeCl_3$, to form the red colored $Fe(OH)_3$ precipitate. The red colored $Fe(OH)_3$ precipitate is filtered out and washed for several times. The formed red colored $Fe(OH)_3$ precipitate is totally put into another reactor followed by adding 14.8 kg of deionized water, 44.6 kg of chloroform, and 9.9 g of lauryl alcohol thereto to form a mixture. The mixture is stirred quickly to form the water-in-oil emulsion. 1.6 kg of phosphoric acid solution having the concentration of 85 wt % is added to the water-in-oil emulsion and then the water-in-oil emulsion is heated to about 50° C. and stirred for about 8 hours. Then, 259.2 g of iron metal powder is added to the water-in-oil emulsion, and stirred for about 24 hours. After that, 513.9 g of $Li_2CO_3$ is added to the water-in-oil emulsion part by part, and stirred for about 8 hours to form solid precursor in the water-in-oil emulsion. The water-in-oil emulsion is cooled to room temperature and left to stand for overnight. The solid precursor is filtered out and collected to be dried at about 80° C. in vacuum. Then, the precursor is mixed with 548 g of poly (vinyl alcohol), and 22 g of formaldehyde in 22 kg of deionized water, and stirred for about 6 hours until the precursor, poly (vinyl alcohol), formaldehyde are uniformly mixed in the water. The mixture is dried in vacuum to remove the water, and then moved to the heating oven filled with nitrogen gas to be heated at about 800° C. for about 2 hours. The lithium iron phosphate is achieved.

EXAMPLE 3

7.46 kg of water solution of $Fe(NO_3)_3$ having the concentration of 15 wt % is put into a reactor and stirred quickly. 1.6 kg of ammonia having the concentration of 15 wt % is dropped slowly to the stirred water solution of $Fe(NO_3)_3$, to form the red colored $Fe(OH)_3$ precipitate. The red colored $Fe(OH)_3$ precipitate is filtered out and washed for several times. The formed red colored $Fe(OH)_3$ precipitate is totally put into another reactor followed by adding 5 kg of deionized water, 10 kg of nitrobenzene, and 4.5 g of polyacrylamide thereto to form a mixture. The mixture is stirred quickly to form the water-in-oil emulsion. 0.8 kg of phosphoric acid solution having the concentration of 85 wt % is added to the water-in-oil emulsion and then the water-in-oil emulsion is heated to about 45° C. and stirred for about 4 hours. Then, 129.6 g of iron metal powder is added to the water-in-oil emulsion, and stirred for about 16 hours. After that, 270 g of $Li_2CO_3$ is added to the water-in-oil emulsion part by part, and stirred for about 4 hours to form solid precursor in the water-in-oil emulsion. The water-in-oil emulsion is cooled to room temperature and left to stand for overnight. The solid precursor is filtered out and collected to be dried at about 80° C. in vacuum. Then, the precursor is mixed with 274 g of sucrose, and 11 g of citric acid in 8 kg of deionized water, and stirred for about 4 hours until the precursor, sucrose, and citric acid are uniformly mixed in the water. The mixture is dried in vacuum to remove the water, and then moved to the heating oven filled with nitrogen gas to be heated at about 750° C. for about 3 hours. The lithium iron phosphate is achieved.

EXAMPLE 4

9.26 kg of water solution of $Fe_2(SO_4)_3$ having the concentration of 20 wt % is put into a reactor and stirred quickly. 4.07 kg of water solution of NaOH having the concentration of 30 wt % is dropped slowly to the stirred water solution of $Fe_2(SO_4)_3$, to form the red colored $Fe(OH)_3$ precipitate. The red colored $Fe(OH)_3$ precipitate is filtered out and washed for several times. The formed red colored $Fe(OH)_3$ precipitate is totally put into another reactor followed by adding 10 kg of deionized water, 20 kg of carbon tetrachloride, and 6 g of polyoxyethylene octylphenol ether thereto to form a mixture. The mixture is stirred quickly to form the water-in-oil emulsion. 1.6 kg of phosphoric acid solution having the concentration of 85 wt % is added to the water-in-oil emulsion and then the water-in-oil emulsion is heated to about 60° C. and stirred for about 8 hours. Then, 259.2 g of iron metal powder is added to the water-in-oil emulsion, and stirred for about 18 hours. After that, 366 g of LiOH is added to the water-in-oil emulsion part by part, and stirred for about 4 hours to form solid precursor in the water-in-oil emulsion. The water-in-oil emulsion is cooled to room temperature and left to stand for overnight. The solid precursor is filtered out and collected to be dried at about 80° C. in vacuum. Then, the precursor is mixed with 350 g of phenol formaldehyde resin, and 12 g of ascorbic acid in 10 kg of deionized water, and stirred for about 5 hours until the precursor, phenol formaldehyde resin, and ascorbic acid are uniformly mixed in the water. The mixture is dried in vacuum to remove the water, and then moved to the heating oven filled with nitrogen gas to be heated at about 700° C. for about 4 hours. The lithium iron phosphate is achieved.

It is to be understood that the above-described embodiment is intended to illustrate rather than limit the disclosure. Variations may be made to the embodiment without departing from the spirit of the disclosure as claimed. The above-described embodiments are intended to illustrate the scope of the disclosure and not restricted to the scope of the disclosure.

It is also to be understood that the above description and the claims drawn to a method may include some indication in reference to certain steps. However, the indication used is only to be viewed for identification purposes and not as a suggestion as to an order for the steps.

What is claimed is:

1. A method for making lithium iron phosphate, comprising:
    reacting an alkali with a ferric salt in water to form a red colored ferric hydroxide precipitate in the water;
    mixing the red colored ferric hydroxide precipitate with deionized water, organic solvent, and emulsifier to form a water-in-oil emulsion;
    adding phosphoric acid solution and iron metal powder to the water-in-oil emulsion to form ferrous hydrogen phosphate;
    introducing a lithium source to the water-in-oil emulsion and reacting the lithium source with the ferrous hydrogen phosphate to form a precursor in the water-in-oil emulsion; and
    heating the precursor in a protective gas at a heating temperature in a range from about 600° C. to about 800° C. to form lithium iron phosphate.

2. The method of claim 1, wherein the step of reacting an alkali with a ferric salt in water comprises adding a alkali water solution droplet by droplet to a ferric salt water solution during stirring of the ferric salt water solution.

3. The method of claim 2, wherein a concentration of the alkali water solution and a concentration of the ferric salt water solution are both about 5 wt % to about 30 wt %.

4. The method of claim 1, wherein a molar ratio of iron (III) ion to hydroxide ion in the water is in a range from about 1:3 to about 1:3.3.

5. The method of claim 1 further comprising a step of filtering the red colored ferric hydroxide precipitate out from the water.

6. The method of claim 1, wherein the organic solvent is selected from the group consisting of toluene, xylene, petroleum ether, chloroform, methylene chloride, carbon tetrachloride, nitrobenzene, ethyl acetate, and combinations thereof.

7. The method of claim 1, wherein the emulsifier is selected from the group consisting of nonylphenoxypoly(ethyleneoxy)ethanol, polyoxyethylene octylphenol ether, lauryl alcohol, polyethylene glycol, polyacrylic acid, polyacrylamide, and combinations thereof.

8. The method of claim 1, wherein a mass ratio of the deionized water to the red colored ferric hydroxide precipitate can be in a range from about 5:1 to about 15:1, a mass ratio of the organic solvent to the deionized water is in a range from about 1:1 to about 3:1, a mass ratio of the emulsifier to the red colored ferric hydroxide precipitate is in a range from about 0.1:100 to about 1:100.

9. The method of claim 1, wherein the step of adding phosphoric acid and iron metal powder to the water-in-oil emulsion comprises substeps of:
    adding the phosphoric acid solution to the water-in-oil emulsion;
    stirring the water-in-oil emulsion having phosphoric acid therein at a temperature ranged from about 40° C. to about 60° C. for a first period of time;
    adding the iron metal powder to the water-in-oil emulsion having the phosphoric acid therein; and
    stirring the water-in-oil emulsion having the phosphoric acid and the iron metal powder therein for a second period of time to form the ferrous hydrogen phosphate.

10. The method of claim 1, wherein a mass concentration of the phosphoric acid solution is about 85%.

11. The method of claim 1, wherein the step of introducing a lithium source to the water-in-oil emulsion and reacting the lithium source with the ferrous hydrogen phosphate comprises:
    introducing the lithium source part by part and stirring for about 2 hours to about 8 hours at the temperature range from about 40° C. to about 60° C.;
    cooling the water-in-oil emulsion to room temperature;
    filtering the precursor out;
    drying the precursor in vacuum.

12. The method of claim 11, wherein the lithium source is selected from the group consisting of lithium hydroxide, lithium carbonate, and a combination thereof.

13. The method of claim 1 further comprising a carbon source coating step of mixing the precursor with a carbon source organic material, an antioxidant, and deionized water to form a mixture.

14. The method of claim 13, wherein the carbon source organic material is selected from the group consisting of starch, sucrose, glucose, phenol formaldehyde resin, polylactic acid, poly (vinyl alcohol), and combinations thereof.

15. The method of claim 13, wherein the antioxidant is selected from the group consisting of formaldehyde, ascorbic acid, citric acid, oxalic acid, and combinations thereof.

16. The method of claim 13, wherein a mass ratio of the carbon source organic material to the lithium iron phosphate to be formed is in a range from about 2:100 to about 25:100, a mass ratio of the antioxidant to the lithium iron phosphate to be formed is in a range from about 0.1:100 to about 1:100, a mass ratio of the deionized water to the lithium iron phosphate to be formed is in a range from about 1:1 to about 10:1.

17. The method of claim 1, wherein the protective gas is at least one of nitrogen gas and inert gas.

18. The method of claim 1, wherein the heating time period for heating the precursor is from about 3 hours to about 10 hours.

19. The method of claim 1, wherein a molar ratio of iron element, phosphorus element, and lithium element is in a range from about 1:1:1 to about 1:1:1.15.

20. The method of claim 1, wherein a molar ratio of iron element in the ferric salt to the iron metal powder is about 2:1.

* * * * *